United States Patent
Knoedler et al.

(10) Patent No.: US 12,072,425 B2
(45) Date of Patent: Aug. 27, 2024

(54) METHOD FOR GNSS-BASED LOCATION OF A VEHICLE HAVING A GNSS LOCATION DEVICE IN VIEW OF INTEGRITY INFORMATION PROVIDED IN RELATION TO GNSS CORRECTION DATA

(71) Applicant: Robert Bosch GmbH, Stuttgart (DE)

(72) Inventors: Kosmas Knoedler, Bad Wimpfen (DE); Marco Limberger, Ludwigsburg (DE); Markus Langer, Sachsenheim (DE); Thomas Speth, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/504,604

(22) Filed: Oct. 19, 2021

(65) Prior Publication Data
US 2022/0128707 A1    Apr. 28, 2022

(30) Foreign Application Priority Data
Oct. 22, 2020 (DE) ............ 10 2020 213 315.8

(51) Int. Cl.
| | | |
|---|---|---|
| *G01S 19/40* | (2010.01) | |
| *G01S 19/07* | (2010.01) | |
| *G01S 19/42* | (2010.01) | |
| *G01S 19/08* | (2010.01) | |

(52) U.S. Cl.
CPC .............. *G01S 19/40* (2013.01); *G01S 19/07* (2013.01); *G01S 19/42* (2013.01); *G01S 19/074* (2019.08); *G01S 19/08* (2013.01)

(58) Field of Classification Search
CPC .......... G01S 19/40; G01S 19/42; G01S 19/07; G01S 19/074; G01S 19/08
USPC ............. 342/357.23, 357.25, 357.44, 357.45
See application file for complete search history.

(56) References Cited

U.S. PATENT DOCUMENTS

| | | | | |
|---|---|---|---|---|
| 8,032,299 B2 * | 10/2011 | Fernandez Hernandez | ................ | |
| | | | | G01C 21/30 |
| | | | | 701/436 |
| 8,046,169 B2 * | 10/2011 | Mazlum | ................ | G01S 19/50 |
| | | | | 701/472 |
| 8,200,430 B2 * | 6/2012 | Trautenberg | ............ | G01S 19/08 |
| | | | | 342/357.395 |
| 8,332,146 B2 | 12/2012 | Rosing et al. | | |

(Continued)

FOREIGN PATENT DOCUMENTS

| | | | | |
|---|---|---|---|---|
| DE | 102021104640 A1 * | 9/2022 | ............ | G01S 19/20 |
| EP | 1729145 A1 * | 12/2006 | ............ | G01S 19/08 |
| WO | WO-2006077174 A1 * | 7/2006 | ............ | G01S 19/43 |

*Primary Examiner* — Chuong P Nguyen
(74) *Attorney, Agent, or Firm* — Maginot, Moore & Beck LLP

(57) ABSTRACT

The disclosure concerns a method for GNSS-based location of a vehicle having a GNSS location device in view of integrity information provided in relation to GNSS correction data, comprising at least the following steps: (a) receiving GNSS correction data for correcting delay measurements for GNSS-based location from a GNSS correction data provision system, (b) receiving at least one piece of integrity information about the reliability of the GNSS correction data from the GNSS correction data provision system, (c) evaluating the at least one piece of integrity information about the reliability of the GNSS correction data that was received in step (b), and (d) influencing GNSS-based location of the vehicle on the basis of the evaluation from step (c).

9 Claims, 2 Drawing Sheets

(56) References Cited

U.S. PATENT DOCUMENTS

| | | | | |
|---|---|---|---|---|
| 9,923,626 B2 * | 3/2018 | Loomis | ................... | G01S 19/43 |
| 10,386,202 B2 * | 8/2019 | Aucoin | ................... | G01C 23/00 |
| 10,809,388 B1 | 10/2020 | Carcanague et al. | | |
| 11,043,132 B1 * | 6/2021 | Aucoin | ................... | G01C 21/20 |
| 11,187,813 B2 * | 11/2021 | Brandl | ................... | G05D 1/0022 |
| 11,194,051 B2 * | 12/2021 | Huck | ................... | G05D 1/0278 |
| 11,333,768 B2 * | 5/2022 | Limberger | ............ | G01S 19/072 |
| 11,378,699 B2 * | 7/2022 | Segal | ................... | G01S 19/072 |
| 11,733,392 B2 * | 8/2023 | Metzger | ................. | G01S 19/20 |
| | | | | 342/352 |
| 2011/0288771 A1 * | 11/2011 | Mazlum | ................. | G01S 19/50 |
| | | | | 701/469 |
| 2020/0096649 A1 * | 3/2020 | Brandl | ................... | G01S 19/40 |
| 2021/0149060 A1 * | 5/2021 | Limberger | ............ | G01S 19/072 |
| 2022/0107427 A1 * | 4/2022 | Kleeman | ................. | G01S 19/07 |
| 2022/0128705 A1 * | 4/2022 | Metzger | ................. | G01S 19/20 |
| 2024/0085566 A1 * | 3/2024 | Mobarak | ................. | G01S 19/07 |

* cited by examiner

METHOD FOR GNSS-BASED LOCATION OF A VEHICLE HAVING A GNSS LOCATION DEVICE IN VIEW OF INTEGRITY INFORMATION PROVIDED IN RELATION TO GNSS CORRECTION DATA

This application claims priority under 35 U.S.C. § 119 to patent application no. DE 10 2020 213 315.8, filed on Oct. 22, 2020 in Germany, the disclosure of which is incorporated herein by reference in its entirety.

The disclosure concerns a method for GNSS-based location of a vehicle having a GNSS location device in view of integrity information provided in relation to GNSS correction data. In addition, a computer program for carrying out the method, a machine-readable storage medium on which the computer program is stored and a GNSS location device for carrying out the method are specified.

BACKGROUND

The use of correction data for precise GNSS positioning is customary in many fields of application such as surveying, avionics, agriculture, deformation monitoring, etc. Differential GNSS approaches are often applied, which involve taking into consideration multiple receivers in order to calculate differences and thus to eliminate errors that are common to both receivers.

As an alternative, correction services can be taken into account in order to request corrections for the position and the time of the user. Initially, the transmitted information is usually the corrections themselves, typically either in the form of an observation state representation (OSR) provided as range corrections for each satellite or in the form of a space state representation (SSR) provided as corrections for each physical error quantity. To date, these corrections are provided without additional integrity information.

SUMMARY

The proposal here is a method for GNSS-based location of a vehicle having a GNSS location device in view of integrity information provided in relation to GNSS correction data, comprising at least the following steps:
  a) receiving GNSS correction data for correcting delay measurements for GNSS-based location from a GNSS correction data provision system,
  b) receiving at least one piece of integrity information about the reliability of the GNSS correction data from the GNSS correction data provision system,
  c) evaluating the at least one piece of integrity information about the reliability of the GNSS correction data that was received in step b),
  d) influencing GNSS-based location of the vehicle on the basis of the evaluation from step c).

The indicated order of steps a) to d) is illustrative and, for a normal cycle of the method, can be taken at least once in the indicated order for the purpose of carrying out the method. In addition, at least some of steps a) to d), in particular steps a) and b) and/or c) and d), can also be carried out in parallel or at the same time.

The method advantageously contributes to GNSS-based location being able to be carried out in a vehicle on the basis of integrity information about the reliability of GNSS correction data. An advantage of the method can in particular be regarded as being that vehicle-external integrity information can be used to improve (the safety and/or accuracy of) in-vehicle, GNSS-based location. Additionally, the method allows GNSS correction data to be used in a vehicle on the basis of integrity information about the reliability of these GNSS correction data. This means that the GNSS correction data can advantageously also be used for safety-critical applications, such as for example at least partially automated or autonomous driving. In this regard, it is advantageously possible to achieve the effect that GNSS location can be carried out with such precision and reliability that it can at least sometimes also be used as the sole location method or as one of a few location methods for safety-critical applications, such as for example at least partially automated or autonomous driving. In particular, the integrity information (in relation to the correction data) can be delivered (directly) by a provider of correction services.

The vehicle can be a motor vehicle, for example, such as an (if applicable also electrically driven) automobile, for example. Additionally, the vehicle can be designed for at least partially automated and/or autonomous driving operation. GNSS-based location can comprise ascertaining an ego position, ego velocity and/or ego acceleration of the vehicle, for example. The integrity information provided in relation to GNSS correction data is normally integrity information of a GNSS correction data provision system, or integrity information provided by a GNSS correction data provision system (vis-à-vis the correction data provided).

Prior to step a), GNSS correction data can be ascertained by a (or the) GNSS correction data provision system, for example. The GNSS correction data can be ascertained by means of differential GNSS measurements, for example. This can involve for example multiple GNSS receivers being taken into consideration in order to calculate differences between the delay measurements of these GNSS receivers, so as to eliminate errors that are common to both GNSS receivers. Alternatively or cumulatively, reference measurements can be carried out using fixed GNSS receivers, the geodetic position, or position on the earth's surface, of which is known. The GNSS correction data can be ascertained (and later provided) on a location-dependent and/or time-dependent basis, for example. The GNSS correction data provision system can be operated by a GNSS correction service provider, for example.

The GNSS correction data can in particular comprise delay corrections, health information relating to satellites and/or the constellations thereof, disturbance indices for atmosphere and/or quality indicators. By way of example, the GNSS correction data can comprise one or more of the following (delay) corrections:
  geometric corrections, such as for example concerning the satellite clock, the satellite orbit and/or satellite biases;
  atmospheric corrections, in particular tropospheric corrections, which may also be able to be considered among the geometric corrections;
  ionospheric corrections;
  qualitative information, such as for example satellite health information, satellite constellation information, geomagnetic disturbance indices and/or indices relating to the weather.

The GNSS correction data provision system can for example comprise at least one (if applicable fixed) GNSS receiver and an evaluation device for ascertaining the GNSS correction data from received GNSS signals. Additionally, the GNSS correction data provision system can comprise a (GNSS) transmitter, by means of which the GNSS correction data (preferably together with the integrity information) can be provided to other GNSS receivers. In this regard, the transmitter can transmit the data or information to a satellite, for example, which can then distribute said data or information to a multiplicity of receivers.

Additionally, prior to step a), at least one piece of integrity information about the reliability of the GNSS correction data can be ascertained by the GNSS correction data provision system, for example. Said integrity information can likewise be ascertained by the evaluation device of the GNSS correction data provision system, for example. By way of example, the at least one piece of integrity information can be ascertained on a location-dependent and/or time-dependent basis. The integrity information can be a confidence value or a confidence range, for example. By way of example, the integrity information can comprise a probability statement indicating the probability of the GNSS correction data being correct. Alternatively or cumulatively, the integrity information can contain information about the extent to which an integrity check was carried out by the GNSS correction data provision system. By way of example, the user (for example vehicle and/or GNSS location device) can then itself decide whether it still uses the data in the event of a failed integrity check (at the correction service), for example, or carries out further checks of its own, for example.

Alternatively or cumulatively, the integrity information can comprise a measure of and/or a statement about integrity or reliability of the GNSS correction data. This measure or this statement can be (ascertained and) provided in the style of a fault report, for example, in particular by outputting a specific disturbance level from in particular multiple defined disturbance levels and/or by outputting a specific integrity value from in particular multiple defined integrity values. The disturbance levels or the integrity values can be defined on the basis of the reliability of the GNSS correction data, or in other words can describe or characterize, in particular quantify, the reliability of the GNSS correction data. Additionally, the integrity information can be (ascertained and) provided in the form of a so-called flag, for example. Such a flag can be a particularly advantageous way of displaying disturbance levels or integrity values. It may also be possible to use multiple disturbance levels or integrity values or multiple flags in order to display the integrity of different (for example atmosphere-specific, satellite-specific and/or satellite-constellation-specific) parameters of the GNSS correction data.

The at least one piece of integrity information can in particular comprise constellation-specific integrity information and/or satellite-specific integrity information and/or atmosphere-specific integrity information. Illustrative constellation-specific integrity information can be ascertained for example by taking the presence of signals from a subset of satellites of a specific GNSS (e.g. GALILEO) and the analysis of observations and correction data as a basis for deciding how the integrity of the constellation should be rated overall. For the purposes of explanation, it is possible to use an example in which the GNSS operator loads an incorrect system time for the GNSS onto the satellites via uplink stations, said system time then in turn being incorrectly used by the user, with the result that discrepancies in the data of the individual GNSSs can arise. This could be brought to light for the user by constellation-specific integrity information. Illustrative satellite-specific integrity information can be ascertained for example by rating the integrity of the correction data of a single satellite. For the purposes of explanation, it is possible to use an example in which a satellite demonstrates anomalies in the transmitted data on account of aging phenomena for its atomic clock. This could be brought to light for the user by satellite-specific integrity information. Illustrative atmosphere-specific integrity information can be ascertained for example by analyzing the signal of single or multiple satellites from a region for whether time delays suggest that the signals transmitted by said satellites are passing through local atmospheric disturbances. This could be brought to light for the user by atmosphere-specific integrity information.

In addition, the GNSS correction data provision system may use different levels of integrity check, in particular in terms of the scope and/or protection of the integrity check, and preferably provide (notify the user of) the integrity monitoring or level(s) of integrity check that is (are) used.

By way of example, the at least one piece of integrity information can comprise one or more of the following pieces of information, if applicable provided in the form of an (alarm) flag:
  integrity or reliability of geometric corrections, such as for example concerning the satellite clock, the satellite orbit and/or satellite biases;
  integrity or reliability of atmospheric corrections, in particular tropospheric corrections;
  integrity or reliability of ionospheric corrections;
  integrity or reliability of qualitative information, such as for example satellite health information (satellite-specific integrity information), satellite constellation information (satellite-constellation-specific integrity information), geomagnetic disturbance indices and/or indices relating to the weather.

The at least one piece of integrity information preferably comprises at least one flag for displaying the integrity and/or reliability of the available information (or information provided by the GNSS correction data provision system) about the (current and/or local) GNSS satellite geometry or GNSS satellite constellation and/or at least one flag for displaying the integrity and/or reliability of the available information (or information provided by the GNSS correction data provision system) about the (current and/or local) atmospheric situation. Alternatively or cumulatively, the at least one piece of integrity information can also comprise at least one flag for displaying the integrity and/or reliability of the available information (or information provided by the GNSS correction data provision system) about the (current and/or local) status (for example activity, age and/or health) of at least one GNSS satellite. If the integrity and/or reliability in question does not meet the (pre-determinable) requirements for in particular a navigation solution that is as safe as possible, the flag can be output in the form of an alarm flag, for example.

The at least one piece of integrity information comprises for example at least one satellite-specific flag, a satellite-constellation-specific flag and/or an atmosphere-specific flag for displaying the integrity and/or reliability of the available information (or information provided by the GNSS correction data provision system). The flags for describing reliability can be output in tiers, the tier being able to be chosen in particular on the basis of the severity of an applicable disturbance. In the simplest case, the flags can be output in two tiers or on a binary basis, with for example a 0 flag or no flag being able to be output if there is no disturbance and a 1 flag or an alarm flag being able to be output if there is a disturbance. The at least one piece of integrity information can for example comprise at least one flag for displaying the integrity and/or reliability of the available information (or information provided by the GNSS correction data provision system) from the following set of possible flags:
  GPS satellite geometry (alarm) flag;
  GLONASS satellite geometry (alarm) flag;

Galileo satellite geometry (alarm) flag;
regional troposphere (alarm) flag;
regional ionosphere (alarm) flag.

The integrity information can additionally also be associated with the relevant GNSS correction data by the GNSS correction data provision system. In this regard, data pairs or datasets of GNSS correction data and related integrity information can be created, for example, in order to be able to provide these data and this information collectively in each case. The GNSS correction data and the at least one piece of integrity information can additionally be (collectively) provided for the at least one GNSS location device by the GNSS correction data provision system. Said data and information can be (collectively) provided by way of a transmitter of the GNSS correction data provision system, for example. The provision can additionally comprise distribution to a multiplicity of GNSS receivers, for example, via at least one (generally geostationary) satellite, the Internet and/or (mobile) radio.

Step a) involves receiving GNSS correction data for correcting delay measurements for GNSS-based location from a GNSS correction data provision system. By way of example, the GNSS correction data can be received via at least one satellite, via the Internet and/or via (mobile) radio. The GNSS correction data can be ascertained and/or provided according to the examples cited above. In particular, the GNSS correction data can comprise one or more of the pieces of information described in this regard above.

Step b) involves receiving at least one piece of integrity information about the reliability of the GNSS correction data from the GNSS correction data provision system. By way of example, the at least one piece of integrity information can be received via at least one satellite, via the Internet and/or via (mobile) radio. The at least one piece of integrity information can be ascertained and/or provided according to the examples cited above. In particular, the at least one piece of integrity information can comprise one or more of the pieces of information described in this regard above.

Step c) involves evaluating the at least one piece of integrity information about the reliability of the GNSS correction data that was received in step b). The evaluation can be carried out by the GNSS location device itself, for example. Alternatively, the evaluation can be carried out by a device of the vehicle that is connected to the GNSS location device and/or that can access said GNSS location device. Step c) can also involve evaluating multiple pieces of (different or different kinds of) integrity information received in step b). If multiple pieces of integrity information or multiple types of integrity information are evaluated, said integrity information can differ for example in respect of whether it is satellite-specific (satellite-related), satellite-constellation-specific (satellite-constellation-related) or atmosphere-specific (atmosphere-related). As such, for example at least one piece of received satellite-specific integrity information and/or satellite-constellation-specific integrity information and/or atmosphere-specific integrity information can be evaluated. Preferably, at least one piece of received satellite-constellation-specific integrity information and/or atmosphere-specific integrity information is evaluated.

Step d) involves influencing GNSS-based location of the vehicle on the basis of the evaluation from step c). In particular, step d) involves altering GNSS-based location of the vehicle on the basis of the evaluation from step c).

The influencing or alteration can take place on the basis of a disturbance level evaluated in step c) or an integrity value evaluated in step c), for example. By way of illustration, the influencing or alteration in step d) can additionally take place in tiers. As such, for example one tier of the influencing or alteration of GNSS-based location can take place on the basis of a disturbance level evaluated in step c) or an integrity value evaluated in step c). There can also be provision for the influence of the GNSS signals on location of the vehicle to be reduced (for example downweighted) if the result of the evaluation is that the GNSS signals are not sufficiently reliable. In this regard, the influence of surroundings sensor data and/or inertia data and/or map data on location can be increased, for example. The surroundings sensor data can be provided by surroundings sensors (for example: camera, RADAR, LIDAR, ultrasound) of the vehicle. The inertia data can be provided by an inertial unit of the vehicle, which can evaluate wheel speed sensors, acceleration sensors and/or steering angle sensors of the vehicle, for example. The map data can be taken from a digital map of the surroundings around the vehicle, for example. The aforementioned sensor data may be used for sensor fusion for location.

In this regard, the GNSS correction data can also be evaluated in view of the at least one piece of integrity information by the at least one GNSS location device. This too allows GNSS-based location to be influenced. By way of example, a decision about the use or nonuse of the GNSS correction data can be made on the basis of the integrity information, in particular an adequate (confidence) value of the integrity information. The evaluation can additionally comprise weighting of the received GNSS correction data on the basis of the at least one piece of integrity information, for example.

GNSS-based location can be influenced by virtue of the GNSS location device selecting at least one specific measure from a multiplicity of defined measures on the basis of the evaluated at least one piece of integrity information, for example. The specific measure is in particular one relating to (further) use or relating to handling of the (relevant) GNSS correction data. The multiplicity of defined measures can comprise at least two or more of the following measures, for example: weighting (in particular devaluing or downweighting), monitoring, using or not using, or declining, measurement or navigation data, system restart, error output, (real-time) adaptation of a monitoring sensitivity for the present situation, displaying integrity invalidity at the output of the location device and/or adapting the information about the reliability of a location result. As a further measure, there can even be provision, by way of illustration, for setting the whole system to invalid, in particular if the service region of the correction data provision system is left.

Alternatively or cumulatively, one or more of the following measures can be included in the multiplicity of defined measures, or taken on the basis of the evaluated at least one piece of integrity information:
erasing/resetting correction databases in the software of the GNSS location device;
resetting parameters/Kalman filters in the software of the GNSS location device;
changing the correction data source;
dynamically adapting the navigation estimation, e.g. by accepting lower accuracy for increased robustness;
weighting GNSS observations;
dynamically adapting monitor threshold values;
adapting the protection level;
resetting the navigation system;
rejecting observations or navigation data of a satellite/constellation;
entry in the error memory.

By way of example, there can additionally be provision for GNSS-based location to be influenced by adapting information about the reliability of a location result of the GNSS location device by using the at least one piece of integrity information evaluated in step c). The information about the reliability of a location result can be for example a confidence range containing the (true) position. Applicable confidence ranges can in general also be referred to as a so-called protection level. By way of example, the confidence range can be ascertained (inter alia) on the basis of the at least one piece of integrity information about the reliability of the GNSS correction data, in particular can be increased for less reliable correction data and/or reduced for more reliable correction data.

According to one advantageous configuration, it is proposed that the influencing according to step d) differs on the basis of whether integrity information describing a disturbance that concerns at least one GNSS satellite itself and/or the position thereof or a disturbance that concerns at least one propagation path between a GNSS satellite and the vehicle was evaluated in step c). In particular, the influencing according to step d) can differ according to whether integrity information containing an alarm flag that concerns at least one GNSS satellite itself and/or the position thereof or whether integrity information containing an alarm flag that concerns at least one propagation path between a GNSS satellite and the vehicle was evaluated in step c).

According to another advantageous configuration, it is proposed that the influencing according to step d) is greater if satellite-constellation-specific and/or satellite-specific integrity information was evaluated in step c) than if atmosphere-specific integrity information was evaluated in step c). By way of example, there can be provision for the influencing according to step d) to be greater if satellite-constellation-specific and/or satellite-specific integrity information that permits a satellite-constellation-specific and/or satellite-specific disturbance to be inferred was evaluated in step c) than if atmosphere-specific integrity information that permits an atmosphere-specific disturbance to be inferred was evaluated in step c). In particular, there can be provision for the influencing according to step d) to be greater if satellite-constellation-specific and/or satellite-specific integrity information that contains an alarm flag was evaluated in step c) than if atmosphere-specific integrity information that contains an alarm flag was evaluated in step c).

According to another advantageous configuration, it is proposed that GNSS-based location continues to be operated in an adapted manner in step d) if atmosphere-specific integrity information was evaluated in step c). By way of example, there can be provision for GNSS-based location to continue to be operated in an adapted manner in step d) if atmosphere-specific integrity information that permits an atmosphere-specific disturbance to be inferred was evaluated in step c). In particular, there can be provision for GNSS-based location to continue to be operated in an adapted manner in step d) if atmosphere-specific integrity information that contains an alarm flag was evaluated in step c). In this regard, there can be provision for example for the influence of the GNSS signals on location of the vehicle to be reduced (for example downweighted). To compensate, the influence of surroundings sensor data and/or inertia data and/or map data on location can be increased, for example. There can additionally be provision for a measure for adapting GNSS-based location on the basis of a disturbance level ascertained from the integrity information to be determined.

According to another advantageous configuration, it is proposed that GNSS-based location is adapted by selecting suitable GNSS satellites and/or weighting the available GNSS satellite signals. If an atmosphere-specific disturbance is present only locally, for example, GNSS-based location can be adapted for example by excluding satellites that are particularly greatly affected by the local disturbance from location or accordingly downweighting said satellites.

According to another advantageous configuration, it is proposed that GNSS-based location is interrupted in step d) if satellite-constellation-specific integrity information was evaluated in step c). By way of example, there can be provision for GNSS-based location to be interrupted in step d) if satellite-constellation-specific integrity information that permits a constellation-specific disturbance to be inferred was evaluated in step c). In particular, there can be provision for GNSS-based location to be interrupted in step d) if satellite-constellation-specific integrity information that contains an alarm flag was evaluated in step c). Interruption of GNSS-based location is advantageous in this case because a disturbance that affects the whole satellite constellation means that it can generally be assumed that reliable GNSS-based location is no longer possible. By contrast, for example atmospheric disturbances mean that it is generally possible to resort to measures (based on empirical values) that permit GNSS-based location to be adapted.

According to another advantageous configuration, it is proposed that a warning message is output on the basis of the influencing according to step d). The type of warning message can be output on the basis of a disturbance level that can be ascertained from the integrity information, for example. The warning message can be output to other systems of the vehicle and/or to a driver of the vehicle, for example.

According to another aspect, a computer program for carrying out a method that is described here is proposed. In other words, this concerns in particular a computer program (product), comprising commands that, when the program is executed by a computer, prompt said computer to perform a method that is described here.

According to another aspect, a machine-readable storage medium on which the computer program described here is deposited or stored is proposed. The machine-readable storage medium is normally a computer-readable data medium.

According to another aspect, a GNSS location device for a vehicle is proposed, wherein the GNSS location device is designed to carry out a method that is described here. By way of example, the GNSS location device can be a GNSS sensor of a (motor) vehicle, such as for example an automobile. The GNSS location device can be a part of a GNSS system, additionally comprising at least one GNSS correction data provision system and/or if applicable (a) further GNSS location device(s). By way of example, the GNSS location device can be part of a motion and position sensor for a (motor) vehicle. By way of example, the vehicle can be designed for at least partially automated or autonomous driving operation, for example as a result of an appropriately designed control unit. The motion and position sensor and/or the GNSS location device are in particular arranged in or on the vehicle. By way of example, the GNSS location device can comprise a computer and/or a control unit (controller) that can execute commands in order to perform the method. To this end, the computer or the control unit can execute the specified computer program, for example. The computer or the control unit can for example access the specified storage medium in order to be able to execute the computer program.

The details, features and advantageous configurations discussed in connection with the method can accordingly also arise for the computer program and/or storage medium and/or GNSS location device presented here, and vice versa. In this respect, reference is made to the entire content of the embodiments there for the purpose of characterizing the features in more detail.

BRIEF DESCRIPTION OF THE DRAWINGS

The solution presented here and the technical context for said solution are explained in more detail below with reference to the figures. It should be pointed out that the disclosure is not intended to be restricted by the exemplary embodiments shown. In particular, unless explicitly shown otherwise, it is also possible to extract partial aspects of the substantive matter explained in the figures and to combine said partial aspects with other parts and/or insights from other figures and/or the present description. In the figures.

DETAIL DESCRIPTION

Figure 1:
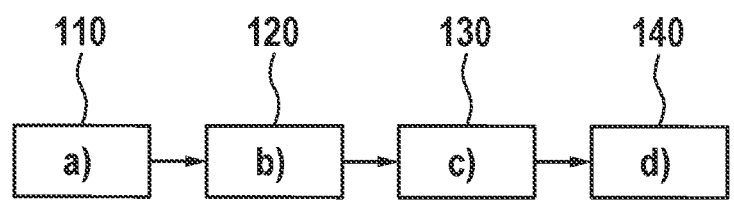
FIG. 1: schematically shows an illustrative cycle of the method described here.

FIG. 1 schematically shows an illustrative cycle of the method described here. The method is used for GNSS-based location of a vehicle 1 (cf. FIG. 2) having a GNSS location device 3 in view of integrity information 5 provided in relation to GNSS correction data 4. The order of steps a) to d) that is depicted by the blocks 110, 120, 130 and 140 is illustrative and can be taken at least once in the depicted order for the purpose of carrying out the method.

In block 110, step a) involves receiving GNSS correction data 4 for correcting delay measurements for GNSS-based location from a GNSS correction data provision system 2. In block 120, step b) involves receiving at least one piece of integrity information 5 about the reliability of the GNSS correction data 4 from the GNSS correction data provision system 2. In block 130, step c) involves evaluating the at least one piece of integrity information 5 about the reliability of the GNSS correction data 4 that was received in step b). In block 140, step d) involves influencing GNSS-based location of the vehicle 1 on the basis of the evaluation from step c).

Figure 2:
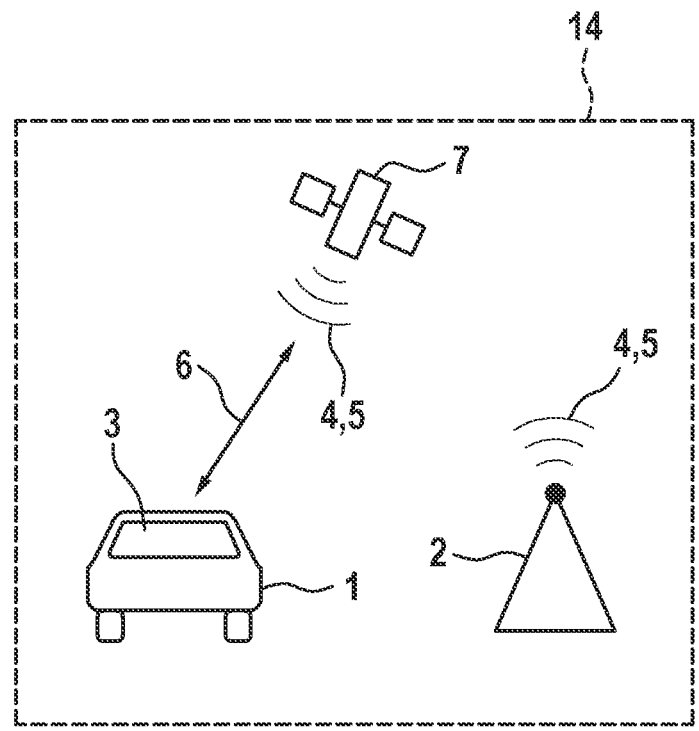
FIG. 2: schematically shows an illustrative design of a GNSS system.

FIG. 2 schematically shows an illustrative design of a GNSS system 14. The GNSS system 14 here comprises a GNSS correction data provision system 2 and a GNSS location device 3, by way of illustration. FIG. 2 demonstrates, by way of illustration, that the GNSS location device 3 can be a part of a vehicle 1, or that the GNSS location device 3 can be arranged in and/or on a vehicle 1. The GNSS location device 2 is designed to carry out a method that is described here. The GNSS correction data 4 and the related integrity information 5 can be provided or distributed by the GNSS correction data provision system 2 via a GNSS satellite 7, for example. A propagation path 6 is shown by way of illustration between the GNSS satellite 7 and the vehicle 1, or the GNSS location device 3.

The influencing according to step d) can differ for example on the basis of whether integrity information 5 describing a disturbance that concerns at least one GNSS satellite 7 itself and/or the position thereof or a disturbance that concerns at least one propagation path 6 between a GNSS satellite 7 and the vehicle 1 was evaluated in step c).

There can be provision for the influencing according to step d) to be greater if satellite-constellation-specific and/or satellite-specific integrity information 5 was evaluated in step c) than if atmosphere-specific integrity information 5 was evaluated in step c).

Additionally, GNSS-based location can continue to be operated in an adapted manner in step d) if atmosphere-specific integrity information 5 was evaluated in step c). GNSS-based location can be adapted by selecting suitable GNSS satellites 7 and/or weighting the available GNSS satellite signals. Alternatively or cumulatively, there can be provision for GNSS-based location to be interrupted in step d) if satellite-constellation-specific integrity information 5 was evaluated in step c). Additionally, a warning message can be output on the basis of the influencing according to step d).

Figure 3:
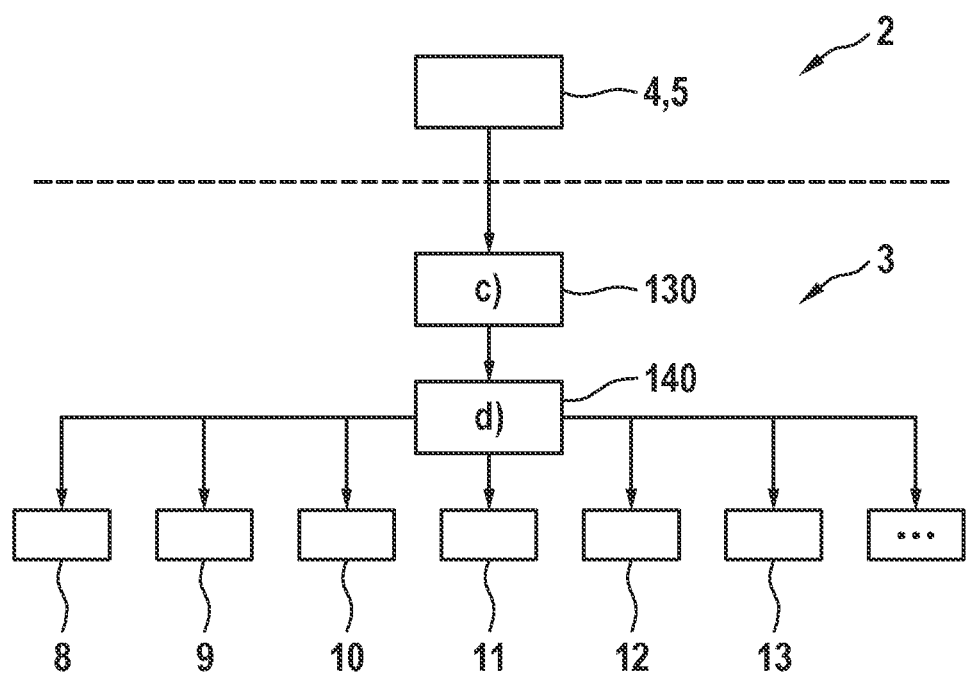
FIG. 3: schematically shows an illustrative cycle of a part of the method described here.

FIG. 3 schematically shows an illustrative cycle of a part of the method described here. It demonstrates, by way of illustration, that the method can use data that are provided by a (vehicle-external) GNSS correction data provision system 2. Here, these data comprise in particular GNSS correction data 4 for correcting delay measurements for GNSS-based location and integrity information 5 about the reliability of the GNSS correction data 4. Additionally, it demonstrates, by way of illustration, that steps c) and d) can be carried out by the (vehicle-internal) GNSS location device 3.

FIG. 3 also shows, by way of illustration, that a (suitable) measure 8, 9, 10, 11, 12, 13 for influencing GNSS-based location of the vehicle 1 on the basis of the at least one piece of integrity information 5 can be selected in block 140 or during step d). This is an example of the fact that, and if applicable how, the GNSS location device 3 can select at least one specific measure from a multiplicity of defined measures 8, 9, 10, 11, 12, 13 for influencing GNSS-based location of the vehicle 1 on the basis of the at least one piece of integrity information 5.

By way of example, there can also be provision for information about the reliability of a location result of the GNSS location device 3 to be adapted using the at least one piece of integrity information 5.

A user using GNSS to strive for precise location is normally, in particular to a certain degree, dependent on the GNSS corrections that a GNSS correction data provision service provides it with. A contribution to heightening integrity or confidence in the information delivered can be made if the user and/or the correction service advantageously monitor the whole system response. In this regard, the correction service can typically take care of monitoring of the following GNSS elements:

signal in space (SIS), such as e.g. anomalies of the satellite clock, orbit maneuvers, instrumental signal delays, atmospheric delays, such as for example ionospheric and tropospheric delays, navigation data errors and transmission errors, such as for example errors in the content of the navigation information provided by the GNSS provider by way of navigation data messages.

Corrections for these elements can be made available to the user, which can be a vehicle 1 and/or a GNSS location device 3, for example, by the GNSS correction data provision service in order to correct the GNSS signal, so as to advantageously allow the user to calculate a position, velocity, attitude and/or time (PVAT) that is as accurate as possible, for example.

The method is distinguished in particular by the in-vehicle consideration of integrity information relating to the GNSS correction data, which information can be included in the correction data information. As a result, it is advantageously possible to heighten the reliability of the location results for in particular safety-critical applications, such as for example autonomous driving.

By way of illustration, the integrity information for the correction data can be taken into consideration in various ways, in particular on the basis of the weight and/or a potential presentation of the information. For example, the service could deliver information about the monitoring status of in particular one or more of the aforementioned (GNSS) elements as integrity information, such as for example:

- status information, such as for example: unmonitored, outside the area of the correction service, insufficient ground stations to observe the relevant parameters, insufficient satellites for overdetermination, etc.
- warning and/or alarm: the element is categorized as having low, medium or e.g. high criticality in regard to a specific error tolerance.

These are only examples, which can also be dependent on the correction service. Other and/or additional integrity information for the different elements is possible.

This information can then be interpreted further by the user, in particular the vehicle, in particular depending on the inherent monitoring capabilities and the system design of the user (for example the vehicle). Typical reactions could be declining measurement or navigation data (payload of the GNSS transmission signals), weighting (in particular in the sense of devaluing) the measurements, realtime adaptation of the monitoring sensitivity for the current situation, displaying integrity invalidity at the output of the user system or even setting the whole system to invalid, in particular if the service region is left and/or a satellite-constellation-specific disturbance is reported. An applicable selection of measures 8, 9, 10, 11, 12, 13 is demonstrated by way of illustration in FIG. 3.

It is also conceivable for a history of the data to be able to be rejected or modified, in particular on the basis of the type of processing by the user, for example in the case of navigation based on Kalman filters or sequential least squares.

The rating and/or categorization of the integrity information provided by the correction service can advantageously be tuned further by the user, in particular depending on the intended application. As such, a compromise between availability as safety versus integrity could be taken into consideration, for example. In this regard, the definition of the reaction by the user can be more stringent with respect to conservative but safe declining of the measurement or less stringent in the direction of higher availability, for example.

The method advantageously contributes to being able to improve or heighten the reliability of location results for in particular safety-critical applications, such as for example autonomous driving.

The invention claimed is:

1. A method for GNSS-based locating of a vehicle having a GNSS location device in view of integrity information provided in relation to GNSS correction data, the method comprising:
   a) receiving with a GNSS receiver in the vehicle GNSS correction data configured to correct for atmospheric delays for GNSS-based locating of a vehicle from a GNSS correction data provision system;
   b) receiving with the GNSS receiver in the vehicle at least one piece of integrity information about a reliability of the GNSS correction data from the GNSS correction data provision system;
   c) evaluating with the GNSS receiver in the vehicle the at least one piece of integrity information;
   d) influencing with the GNSS receiver in the vehicle the GNSS-based locating of the vehicle based on the evaluation from step c);
   e) transmitting the influenced GNSS-based locating of the vehicle from the GNSS receiver in the vehicle to a control unit of the vehicle; and
   f) controlling the vehicle using the transmitted influenced GNSS-based locating of the vehicle, wherein
   the influencing is different depending on whether the at least one piece of integrity information describes (i) a disturbance that concerns a specific GNSS satellite, (ii) a disturbance that concerns a position of the specific GNSS satellite, or (iii) a disturbance that concerns at least one propagation path between the specific GNSS satellite and the vehicle.

2. The method according to claim 1, the d) influencing further comprising:
   influencing the GNSS-based locating of the vehicle relatively more in response to at least one of satellite-constellation-specific and satellite-specific integrity information having been evaluated in step c), compared to in response to atmosphere-specific integrity information having been evaluated in step c).

3. The method according to claim 1, the d) influencing further comprising:
   continuing to operate the GNSS-based locating of the vehicle in an adapted manner in response to atmosphere-specific integrity information having been evaluated in step c) wherein information about the reliability of a location result is adapted.

4. The method according to claim 3, the d) influencing further comprising:
   adapting the GNSS-based locating of the vehicle by at least one of (i) selecting suitable GNSS satellites and (ii) weighting available GNSS satellite signals.

5. The method according to claim 1, the d) influencing further comprising:
   interrupting the GNSS-based locating of the vehicle in response to satellite-constellation-specific integrity information having been evaluated in step c).

6. The method according to claim 1 further comprising:
   outputting with the GNSS receiver in the vehicle a warning message based on the influencing of step d).

7. The method according to claim 1, wherein the method is carried out by executing a computer program.

8. A non-transitory machine-readable storage medium that stores a computer program for GNSS-based locating of a vehicle having a GNSS location device in view of integrity information provided in relation to GNSS correction data, the computer program configured to, when executed:
   a) receive with the GNSS location device GNSS correction data configured to correct for atmospheric delays for GNSS-based locating of a vehicle from a GNSS correction data provision system;
   b) receive with the GNSS location device at least one piece of integrity information about a reliability of the GNSS correction data from the GNSS correction data provision system;
   c) evaluate with the GNSS location device the at least one piece of integrity information;

d) influence with the GNSS location device the GNSS-based locating of the vehicle based on the evaluation from step c);

e) transmit the influenced GNSS-based locating of the vehicle from the GNSS location device to a control unit of the vehicle; and f) control the vehicle using the transmitted influenced GNSS-based locating of the vehicle, wherein the influence is different depending on whether the at least one piece of integrity information describes (i) a disturbance that concerns a specific GNSS satellite, (ii) a disturbance that concerns a position of the specific GNSS satellite, or (iii) a disturbance that concerns at least one propagation path between the specific GNSS satellite and the vehicle.

9. A GNSS location device for GNSS-based locating of a vehicle having a GNSS location device in view of integrity information provided in relation to GNSS correction data, the GNSS location device configured to:

a) receive with the GNSS location device GNSS correction data configured to correct for atmospheric delays for GNSS-based locating of a vehicle from a GNSS correction data provision system;

b) receive with the GNSS location device at least one piece of integrity information about a reliability of the GNSS correction data from the GNSS correction data provision system;

c) evaluate with the GNSS location device the at least one piece of integrity information;

d) influence with the GNSS location device the GNSS-based locating of the vehicle based on the evaluation from step c);

e) transmit the influenced GNSS-based locating of the vehicle from the GNSS location device to a control unit of the vehicle; and f) control the vehicle using the transmitted influenced GNSS-based locating of the vehicle, wherein the influence is different depending on whether the at least one piece of integrity information describes (i) a disturbance that concerns a specific GNSS satellite, (ii) a disturbance that concerns a position of the specific GNSS satellite, or (iii) a disturbance that concerns at least one propagation path between the specific GNSS satellite and the vehicle.

\* \* \* \* \*